United States Patent [19]

Martin

[11] Patent Number: 5,284,682
[45] Date of Patent: Feb. 8, 1994

[54] COPPER/NICKEL EPOXY COATING AND APPLICATION PROCESS AS ANTIFOULING AGENT

[75] Inventor: A. John Martin, Seattle, Wash.

[73] Assignee: American Marine Coatings, Inc., Seattle, Wash.

[21] Appl. No.: 940,314

[22] Filed: Sep. 3, 1992

[51] Int. Cl.$^5$ .............................................. C09D 5/14
[52] U.S. Cl. .................................... 427/386; 427/421; 106/15.05
[58] Field of Search ............................ 106/15.05, 16, ; 427/386, 421; 523/177; 524/781; 528/124

[56] References Cited

U.S. PATENT DOCUMENTS

| | | | |
|---|---|---|---|
| 4,197,233 | 4/1980 | Marshall | 523/177 |
| 4,375,199 | 3/1983 | Graeme-Barber et al. | 114/222 |
| 4,714,623 | 12/1987 | Riccio et al. | 427/27 |
| 5,035,759 | 7/1991 | Andoe | 156/64 |
| 5,173,110 | 12/1992 | Stovicek | 106/15.05 |

OTHER PUBLICATIONS

Kirk-Othmer Encyclopedia of Chemical Technology, vol. 6, pp. 445-454; Third Edition, 1979: Coatings, Marine Epoxy Resin Technology, Paul F. Bruins, Ed., 1968. pp. 78-80 & 269-275.
Industrial and Engineering Chemistry, Apr. 1943, pp. 432-438.
Epoxy Resin Technology, Paul F. Bruins, Ed. 1968: pp. 78-80 (Commercial Epoxy Curing Agents) and pp. 269-275 (Epoxies in Marine and Industrial Maintenance Fields).
Kirk and Othmer, Encyclopedia of Chemical Technology, 3rd Edition, 1979, pp. 445-454, vol. 6, Marine Coatings.
Industrial and Engineering Chemistry, Apr. 1943, pp. 432-436. G. H. Young et al.

Primary Examiner—Terry J. Owens
Assistant Examiner—Erma Cameron
Attorney, Agent, or Firm—Christensen, O'Connor, Johnson & Kindness

[57] ABSTRACT

A coating system comprising an epoxy resin prepolymer, a hardener, wherein the hardener comprises a polyamide, and at least three pounds per gallon copper/nickel alloy particles. The coating system is prepared by mixing the components, spraying a thin film onto a surface, and allowing that film to cure. The coating is suitable for use as a marine anti-foulant coating and for other non-marine exterior surfaces.

14 Claims, No Drawings

COPPER/NICKEL EPOXY COATING AND APPLICATION PROCESS AS ANTIFOULING AGENT

FIELD OF THE INVENTION

The present invention relates to protective coatings, more particularly, to exterior coatings, and still more particularly to marine anti-foulant coatings.

BACKGROUND OF THE INVENTION

Copper, copper complexes, and copper/nickel alloys are known to have marine anti-foulant properties. In particular, bottom paints for boat hulls have been developed that include copper complexes in a semi-water permeable paint. The copper complexes leach out of the paint into the surrounding water layer during use. While effective at inhibiting marine bio-fouling, these paints also are a source of undesirable toxic contamination for surrounding waters.

Copper/nickel alloy boat hulls have also been constructed on an experimental basis, and have been found to be effective in prohibiting fouling. However, such hulls are prohibitively expensive to produce.

Improved bottom-paint coatings have been developed and tested in recent years that include copper/nickel alloy particles suspended in a two-part epoxy resin mixture. These copper/nickel-epoxy mixtures have been found effective as potentially inhibiting marine bio-fouling, and also serve as a corrosion inhibitor and mechanical protective coating. However, such coatings have utilized epoxy systems that include an epoxy resin prepolymer and a polyamine hardener, i.e., crosslinking agent, to cure the prepolymer. These polyamine-based epoxy-copper/nickel coating systems have not met with large commercial success because of difficulties in handling the resin. Epoxies generally exhibit exothermic cure cycles, and thus cure most rapidly in large quantities due to the increased thermal mass.

As a practical effect, the "pot-life" of conventional polyamine-based epoxy coatings has been found to be unsatisfactorily short. As used herein, "pot-life" refers to the duration of time during which the mixed resin (i.e., mixed resin prepolymer and hardener) remains workable, having a satisfactory viscosity for spray application. The mixed resin tends to rapidly increase in viscosity and may cure while still within the mixing container before application is complete. When the resin is dispersed by spraying, the resin may cure within the spray gun, resulting in the loss of expensive equipment. A further drawback of polyamine-based systems is that once the liquid resin has been applied as a film, curing of the resin film proceeds at a much slower pace. This is due to the decreased thermal mass of the sprayed film and conductive and convective heat losses. Because of the slow cure in the thin film stage, the thickness of film that can be applied is limited. Film substantially thicker than 10 mils tend to sag or sheet while still liquid during cure, resulting in an inconsistent final coating thickness.

SUMMARY OF THE INVENTION

The present invention provides a coating system formulated from an epoxy resin prepolymer, a hardener for the epoxy resin prepolymer, wherein the hardener is a polyamide, and at least three pounds of copper/nickel alloy particles per gallon of combined epoxy resin prepolymer and polyamide hardener. In a preferred embodiment, the coating system includes one or more volatile organic solvents to thin the viscosity of the mixed coating system in order to facilitate spray application.

The present invention also provides a process for applying the novel coating by mixing the epoxy resin prepolymer, polyamide hardener, and copper/nickel alloy particles, applying the mixture to a surface, and curing the applied mixture.

The inventor has found that when a polyamide hardener is used, the pot-life in the mixing container and workable application time after mixing are substantially increased. Although polyamide hardeners greatly accelerate cure of the epoxy prepolymer relative to polyamine hardeners, curing is inhibited while the mixture is contained in mass, due to the dilution of the resin and hardener by the solvent. Particularly, the coating mixture remains workable for periods in excess of 24 hours at temperatures of about 65° F. to 75° F. This prevents loss of unused coating, and provides adequate time for application by spraying. Clogging and potential scrapping of spray equipment is likewise avoided. At the same time, the coating system of the present invention has been found to cure at an accelerated rate when applied in a thin film. This is because the organic solvent(s) rapidly flush off after spraying in a thin film, thus no longer inhibiting cure. Thus, while the resin mixture remains liquid and retains a workable viscosity in the mixing container, curing to a hardened state rapidly ensues upon application of the resin mixture to the surface to be coated.

This enables the coating to be sprayed to form a film having a thickness of 10 to 60 mils in a single application, without sagging or sheeting during cure. The sprayed film has been found to surface harden in less than about 45 minutes, and to be substantially completely cured in less than about 24 hours when applied at ambient temperatures of from about 65° to 75° F.

Because of the selection and composition of the coating system, described more fully herein, the applied coating has been found to include an aggregation of copper/nickel particles at the outer surface thereof, with each particle being encapsulated within the epoxy resin matrix. This enables the coating to develop a copper-oxide film, preventing substantial bio-fouling. The coating produced by the present invention may be used as a marine anti-foulant, for use in both sea water and fresh water applications. Copper and nickel do not leach out of the coating at the levels experienced with water permeable paints. Thus, contamination of surrounding waters is minimized. Those organisms that do manage to grow or secure themselves to the coated surface may be easily removed by rubbing, without requiring more extreme mechanical scraping. In addition to the anti-foulant properties, the coating acts as a corrosion-inhibiting protective coating, due to the dielectric nature of the epoxy resin and encapsulation of individual metal particles. The coating is sufficiently hard and durable to also protect the coated surface from scrapes and gouges.

DETAILED DESCRIPTION OF THE PREFERRED EMBODIMENT

The present invention provides a coating system including an epoxy resin prepolymer, a polyamide hardener for the epoxy resin prepolymer, and particulate copper/nickel alloy. In a preferred embodiment, at least three pounds of copper/nickel particles are included per gallon of combined epoxy resin prepolymer and polyamide hardener.

The coating system of the present invention is based upon a two-part resin system, preferably a two-part epoxy resin system. The two-part epoxy resin system includes an epoxy resin prepolymer (i.e., epichlorohydrin bis-phenol A) and a suitable hardener to cause curing of the prepolymer to a plastic state. Each component is preferably diluted with a suitable volatile organic solvent in a quantity sufficient to reduce the viscosity of the resulting mixture to a level suitable for spray application, and to retard cure of the mixture while contained in mass. The hardener, or curing agent, is selected to provide a long "pot-life," or length of time in which the mixed prepolymer and hardener have a workable viscosity when retained within a mixing container, while also having a relatively rapid rate of cure once applied as a thin film.

The preferred hardener for practice of the present invention is a polyamide. Preferably the polyamide is a polyamide adduct, most preferably an aliphatic polyaminoamide. One suitable epoxy resin system is commerically available from American Marine Coatings, Inc., Seattle, Wash., under Part No. Identifier "22K." The American Marine Coatings Inc., system includes an epoxy prepolymer solution and a polyamide hardener solution. The formulation for this coating system, to which copper/nickel particles are added in accordance with the present invention, is set forth below in Table I as a nonlimiting example. This complete coating system, including the copper/nickel particles, is also commercially available from American Marine Coatings, Inc., as "PERMASHIELD ™ 22K" coatings. The mixed epoxy prepolymer and hardener has a density of approximately 8.3 pounds per gallon. The components are combined in a one-to-one ratio by volume.

TABLE I

Example of Suitable
Epoxy Prepolymer and Hardener Formulation Percent
by Weight of Combined Hardener and Epoxy Prepolymer

| Hardener Component | |
|---|---|
| Aliphatic polyaminoamide solution including polyethylene polyamines and toluene (10.3 wt %) | 41.1% |
| Methyl isobutyl ketone | 7.6% |
| Xylene (80 wt %) and ethyl benzene (20 wt %) | 1.6% |
| Epoxy Prepolymer Component | |
| Epoxy resin (Epichlorohydrin bis-phenol A) solution including toluene (7.4 wt %) | 24.6% |
| Xylene (80 wt %) and ethyl benzene (20 wt %) | 20.9% |
| Additives | 4.2% |

The coating system of the present invention also includes particles of a metal having anti-foulant properties, preferably copper or a copper alloy, and more preferably a copper/nickel alloy. The most preferred metal is a copper/nickel alloy containing approximately 90% copper and 10% nickel. Additionally, other copper complexes such as copper oxides or copper hydroxides may be included, although they are not preferred due to their excessive toxicity. For non-marine exterior coatings other metals or metal alloys may be used instead, since the inhibition of biofouling is not a consideration.

A preferred method of applying the coating of the present invention is spraying the coating onto a surface. In order to facilitate spraying, the size of the copper/nickel particles is minimized. Particularly, copper/nickel particles having a minor axis diameter of 15 to 60 microns are suitable, with a minor axis diameter of 25 to 35 microns being preferred, and about 30 microns being most preferred. Further, it has been found desirable to utilize copper/nickel particles that have an elongate, flattened, ovoid shape. This particle size and shape facilitates spraying without clogging of the spray equipment. The small, ovoid particles tend to align longitudinally during passage through the spray nozzle, preventing blockage of the nozzle and internal conduits.

For most convenient usage, it has been found preferable to premix the copper/nickel particles into one of the liquid components, either the epoxy resin prepolymer or polyamide hardener, in advance of system mixing. For example, it has been found satisfactory to add the copper/nickel particles to the epoxy resin prepolymer by mixing to disperse the particles. The resulting epoxy resin prepolymer and copper/nickel particle suspension is stable for storage. Prior to application, this epoxy resin prepolymer and particle mixture is combined and thoroughly mixed with the polyamide hardener.

As noted above, one suitable weight ratio for the epoxy resin prepolymer and polyamide hardener is a one-to-one weight ratio. The amount of copper/nickel particles added to the resin prepolymer and hardener will depend to an extent upon the intended usage of the coating. For most applications, it has been found that the addition of greater than three pounds of copper/nickel particles per gallon of combined epoxy resin prepolymer and polyamide hardener is desired. For use as a marine anti-foulant, a sufficient amount of copper/nickel particles must be added to substantially inhibit marine growth on the coated vessel or structure. More particularly, for anti-foulant coatings it is preferred to use from about 3.5 to about 10 pounds of copper/nickel particles per gallon of combined epoxy resin prepolymer and polyamide hardener. Still more preferably, from about 6 to about 8 pounds of copper/nickel particles, and most preferably about 8 pounds, are used per gallon of combined epoxy resin prepolymer and polyamide hardener. For the above example of a suitable epoxy prepolymer and polyamide hardener system having a density of 8.3 pounds/gallon, the addition of 6 pounds of copper/nickel particles per 7 pounds of combined epoxy resin prepolymer and polyamide hardener results in a mixture having a total volume of about 1 gallon, including about 46% copper/nickel particles by weight based on the total weight of mixed epoxy prepolymer, polyamide hardener, solvents and copper/nickel particles.

When the epoxy resin prepolymer, polyamide hardener, and copper/nickel particles have been thoroughly mixed, the system is ready for application. Although the coating may be rolled or painted on, it is preferred to apply the coating mixture by spraying with an air-gun applicator in order to achieve a uniform coating thickness and particle distribution. The coating is preferably applied in a single layer.

The coating of the present invention is suitable for application to boat hulls made of wood, fiberglass, aluminum or steel, or hulls having a rubberized coating. The coating of the present invention may also be applied to other marine structures, such as pilings, floats, and buoys made of the above listed materials or concrete. The initial viscosity of the coating and cure speed when applied in a thin film are predetermined by the initial formulation to include suitable volatile organic solvents in a sufficient quantity to enable the coating to be sprayed onto vertical or inclined surfaces at thicknesses of up to 60 mils (i.e., .060 inches) without substantial sagging, sheeting, or dripping.

Although particularly well suited for use as a marine coating, the coating is also suitable for use in non-marine coating applications. For example, the coating of the present invention serves as a mechanical protective coating and water sealant for various substrates, including wood or concrete roofs, decking, sidewalks, building exteriors and external structural surfaces. Additionally, the coating of the present invention is believed suitable for coating water tank linings. When applied to a porous surface, the resin mixture permeates into the substrate, leaving a tough durable layer of copper/nickel-filled epoxy resin.

The coating of the present invention cures suitably at ambient temperatures above 40° F., preferably at ambient temperatures of between 60° and 80° F., and still more preferably at average temperatures of 65° F. to 75° F. At temperatures of 90° F. or higher, cure is noticeably accelerated, and it is necessary to thin the resin mixture with a suitable solvent, such as isopropyl alcohol, to achieve a pot-life of sufficient duration.

Once the coating system is mixed, it can be kept in a container, such as a one-gallon container, at average temperatures of 65° F. to 75° F. for a period of approximately 24 hours (the "pot-life") while remaining sprayable. The coating mixture is preferably applied by spraying in a single coat between about 5 to 60 mils thick. Upon spraying, the solvents rapidly evaporate off, allowing the coating film to cure to a durable, hard state.

The following Table 2 provides examples of how the coating thickness affects thin-film cure:

TABLE 2

| Coating Thickness | Surface Hardening Time | Substrate Hardening |
|---|---|---|
| 10 to 20 mils | 30 to 40 min. | 12 to 18 hours |
| 40 to 60 mils | 3 to 5 hours | 24 to 32 hours |

The above figures reflect cure times at average ambient temperatures of approximately 65° to 75° F., with the exact cure time depending upon the ambient conditions. Surface hardening time refers to the time it takes for the external surface of the film to harden sufficiently to allow handling. Substrate hardening refers to the time that it takes for the film to substantially cure to a hard state throughout its thickness.

For marine anti-foulant coatings, a preferred thickness has been found to be at least 20-30 mils. A coating of this thickness has been found to surface harden in about 45 minutes, and to cure substantially completely throughout its cross-section within about 24 hours.

The inventor has found that because of the oblong shape of the copper/nickel particles and the different densities between the copper/nickel particles and the resin, spraying the coating system of the present invention onto a surface results in a concentration of the particles near the external surface of the applied film. In other words, the external surface of the coating is rich in copper/nickel particulates, as compared to the balance of the layer. This results in a freely corroding outer layer, and the formation of a beneficial green-oxide layer that prevents marine fouling. Each particle on the extreme outer surface is adhered by the epoxy resin, while each particle within the coating is encapsulated within a thin layer of the dielectric epoxy resin, and thus is electrically insulated from the other particles and the underlying surface. The coating layer serves as a dielectric layer, insulating against electrical conduction in the direction transverse to the coating layer. The coating layer has an insignificant marginal rate of conductance in the direction transverse to the coating layer on the extreme particle-rich outer surface. Because of the isolation of the particles from each other and the dielectric nature of the epoxy resin, the coating of the present invention also acts to inhibit corrosion of metal surfaces to which the coating has been applied. Further, because the coating can be applied in a single layer, there are no intermediate, built up coating layers to delaminate. This feature, combined with the increased permeation flow path created by the physical presence of the particles in the resin, results in the coating being a very effective water barrier.

EXAMPLE

Six pounds of copper/nickel particles having a diameter of 30 microns were added to approximately 3.5 pounds of epoxy resin prepolymer (American Marine Coatings, Inc., Seattle, Wash., Part No. 22K). The mixture of copper/nickel particles and epoxy prepolymer was then mixed with approximately 3.5 pounds of polyamide hardener (American Marine Coatings, Inc., Seattle, Wash., Part No. 22K). The resulting mixture, approximately one gallon, was then sprayed using a modified 15:1 (fluid delivery pressure:air supply pressure) ratio pump feeding an external mix, air-atomized spray gun. The coating mixture was sprayed onto a boat hull to a thickness of 30 mils. The exterior surface of the coating film hardened within approximately 30 minutes at an ambient temperature between 65° F. and 75° F. The film was completely cured within approximately 24 hours. Copper/nickel particles were observed to be concentrated on the exterior surface of the film.

The present invention has been described above in terms of the preferred embodiment and several variations thereof. Other substitutions, variations, and alterations will be apparent to those of ordinary skill in the art. It is therefore intended that the scope of Letters Patent granted hereon be limited only by the definitions contained in the appended claims.

The embodiments of the invention in which an exclusive property or privilege is claimed are defined as follows:

1. A process for applying an exterior coating on a surface, comprising the steps of:
    mixing an epoxy resin prepolymer, a hardener for the epoxy resin prepolymer, wherein the hardener comprises a polyamide, and at least three pounds of copper/nickel alloy particles per gallon of combined epoxy resin prepolymer and polyamide hardener;
    applying the mixture of prepolymer, hardener and particles to the surface to form a layer of mixture so that the copper/nickel alloy particles are substantially isolated from each other in the combined epoxy resin prepolymer and polyamide hardener; and
    curing the mixture to a hard state, whereby the layer of mixture forms a dielectric layer.

2. The process of claim 1, wherein the mixing step entails mixing from 3.5 to 10 pounds of copper/nickel alloy particles per gallon of combined epoxy resin prepolymer and polyamide hardener.

3. The process of claim 2, wherein the mixing step entails mixing about 8 pounds of copper/nickel alloy particles per gallon of combined epoxy resin prepolymer and polyamide hardener.

4. The process of claim 2, wherein the mixing step comprises mixing a particulate copper/nickel alloy including approximately 90% copper and 10% nickel.

5. The process of claim 2, wherein the polyamide is an aliphatic polyaminoamide.

6. The process of claim 1, further comprising the step of premixing the particulate copper/nickel alloy into one of the epoxy resin prepolymer or polyamide hardener before combining the epoxy resin prepolymer and polyamide hardener.

7. The process of claim 1, wherein the step of applying the mixture comprises applying a coating film having a thickness of from 10 to 60 mils to the surface.

8. The process of claim 7, wherein the step of applying the mixture comprises applying a coating film having a thickness of from 20 to 30 mils to the surface.

9. The process of claim 8, wherein the step of applying the coating mixture is carried out by spraying the mixture onto the surface.

10. The process of claim 9, wherein the 20 to 30 mils thick coating is sprayed onto the surface in a single coat.

11. The process of claim 10, wherein the coating mixture is applied onto an inclined surface.

12. The process of claim 8, wherein the curing step results in surface hardening of the coating at a temperature of from about 65° F. to about 75° F. in from 30 minutes to less than 45 minutes.

13. The process of claim 12, wherein the coating film is substantially completely cured at an average temperature of from about 65° F. to about 75° F. in from 12 hours to less than 24 hours from application.

14. The process of claim 1, wherein the copper/nickel alloy particles comprise ovoid particles having a minor axis diameter of from 15 to 60 microns.

* * * * *